United States Patent
Aiken et al.

(10) Patent No.: US 9,580,960 B2
(45) Date of Patent: Feb. 28, 2017

(54) AERIAL LADDER FOR A FIRE APPARATUS

(71) Applicant: Oshkosh Corporation, Oshkosh, WI (US)

(72) Inventors: Jeffrey D. Aiken, Neenah, WI (US); Eric D. Betz, Clintonville, WI (US); Jennifer L. Bloemer, DePere, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/089,137

(22) Filed: Apr. 1, 2016

(65) Prior Publication Data

US 2016/0215560 A1  Jul. 28, 2016

Related U.S. Application Data

(63) Continuation of application No. 14/552,240, filed on Nov. 24, 2014.

(51) Int. Cl.
| | |
|---|---|
| *E06C 5/04* | (2006.01) |
| *B60R 3/02* | (2006.01) |
| *E06C 5/02* | (2006.01) |
| *A62C 27/00* | (2006.01) |

(52) U.S. Cl.
CPC . *E06C 5/04* (2013.01); *B60R 3/02* (2013.01); *E06C 5/02* (2013.01); *A62C 27/00* (2013.01)

(58) Field of Classification Search
CPC ............... E06C 5/04; E06C 5/02; B60R 3/02; A62C 27/00
USPC ..................... 182/69.4, 106, 207, 198; 280/4
See application file for complete search history.

(56) References Cited

U.S. PATENT DOCUMENTS

| | | |
|---|---|---|
| 2,614,743 A | 10/1952 | Arps |
| 3,346,052 A | 10/1967 | Moore et al. |
| 3,550,146 A | 12/1970 | Eberle |
| 3,675,721 A | 7/1972 | Davidson et al. |
| 3,770,062 A | 11/1973 | Riggs |

(Continued)

FOREIGN PATENT DOCUMENTS

| | | |
|---|---|---|
| CN | 203050481 | 7/2013 |
| DE | 36 40 944 A1 | 6/1988 |

(Continued)

OTHER PUBLICATIONS

U.S. Appl. No. 08/046,623, filed Apr. 14, 1993, Schmitz et al.

(Continued)

*Primary Examiner* — Jacob Knutson
(74) *Attorney, Agent, or Firm* — Foley & Lardner LLP

(57) ABSTRACT

An aerial ladder assembly for a fire apparatus includes a first truss member, a second truss member, and a plurality of rungs coupling the first truss member to the second truss member. The first truss member includes a first base rail, a first hand rail elevated from the first base rail, and a plurality of lacing members coupling the first base rail to the first hand rail. The second truss member includes a second base rail, a second hand rail elevated from the second base rail, and a plurality of lacing members coupling the second base rail to the second hand rail. The first truss member and the second truss member define a first zone and a second zone separated by a transition, and the first base rail and the second base rail have a first shape within the first zone and a second shape within the second zone.

4 Claims, 9 Drawing Sheets

(56) References Cited

U.S. PATENT DOCUMENTS

| | | |
|---|---|---|
| 3,789,869 A | 2/1974 | Morris |
| 4,094,381 A | 6/1978 | Wilkerson |
| 4,317,504 A | 3/1982 | Artaud et al. |
| 4,410,045 A | 10/1983 | Whitman |
| 4,556,200 A | 12/1985 | Shoemaker |
| 4,570,973 A | 2/1986 | Ewers et al. |
| 4,852,690 A * | 8/1989 | Salmi .................. E06C 5/04 182/106 |
| 4,998,982 A * | 3/1991 | Arnold .................. E06C 1/12 182/107 |
| 5,368,317 A | 11/1994 | McCombs et al. |
| 5,389,031 A | 2/1995 | Sharpe et al. |
| 5,538,274 A | 7/1996 | Schmitz et al. |
| 5,820,150 A | 10/1998 | Archer et al. |
| 5,897,123 A | 4/1999 | Cherney et al. |
| 6,006,841 A | 12/1999 | Hunke |
| 6,105,984 A | 8/2000 | Schmitz et al. |
| 6,193,007 B1 | 2/2001 | Lie |
| 6,421,593 B1 | 7/2002 | Kempen et al. |
| 6,516,914 B1 | 2/2003 | Andersen et al. |
| 6,520,494 B1 | 2/2003 | Andersen et al. |
| 6,553,290 B1 | 4/2003 | Pillar |
| 6,561,718 B1 | 5/2003 | Archer et al. |
| 6,598,702 B1 | 7/2003 | McGillewie et al. |
| 6,755,258 B1 | 6/2004 | Hunke et al. |
| 6,757,597 B2 | 6/2004 | Yakes et al. |
| 6,764,085 B1 | 7/2004 | Anderson |
| 6,811,161 B1 | 11/2004 | Anderson |
| 6,860,332 B1 | 3/2005 | Archer et al. |
| 6,882,917 B2 | 4/2005 | Pillar et al. |
| 6,883,815 B2 | 4/2005 | Archer |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,973,768 B2 | 12/2005 | Samejima et al. |
| 6,976,688 B2 | 12/2005 | Archer et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,055,880 B2 | 6/2006 | Archer |
| 7,072,745 B2 | 7/2006 | Pillar et al. |
| 7,100,741 B2 | 9/2006 | Wissler et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,201,255 B1 * | 4/2007 | Kreikemeier .......... C23C 2/36 182/2.5 |
| 7,234,534 B2 | 6/2007 | Froland et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,308,968 B2 * | 12/2007 | Denison ................. A62B 1/02 182/42 |
| 7,331,586 B2 | 2/2008 | Trinkner et al. |
| 7,379,797 B2 | 5/2008 | Nasr et al. |
| 7,387,348 B2 | 6/2008 | Archer et al. |
| 7,389,826 B2 | 6/2008 | Linsmeier et al. |
| 7,392,122 B2 | 6/2008 | Pillar et al. |
| 7,412,307 B2 | 8/2008 | Pillar et al. |
| 7,439,711 B2 | 10/2008 | Bolton |
| 7,451,028 B2 | 11/2008 | Pillar et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,792,949 B2 | 9/2010 | Tewari et al. |
| 7,835,838 B2 | 11/2010 | Pillar et al. |
| 7,848,857 B2 | 12/2010 | Nasr et al. |
| 7,874,373 B2 | 1/2011 | Morrow et al. |
| 8,000,850 B2 | 8/2011 | Nasr et al. |
| 8,095,247 B2 | 1/2012 | Pillar et al. |
| 8,201,656 B2 | 6/2012 | Archer et al. |
| 8,215,241 B2 | 7/2012 | Garneau et al. |
| 8,376,719 B2 | 2/2013 | Grady et al. |
| 8,413,764 B1 | 4/2013 | Cohen et al. |
| 8,739,892 B2 | 6/2014 | Moore et al. |
| 8,839,902 B1 | 9/2014 | Archer et al. |
| 2002/0117345 A1 | 8/2002 | Sztykiel et al. |
| 2003/0158635 A1 | 8/2003 | Pillar et al. |
| 2003/0195680 A1 | 10/2003 | Pillar |
| 2004/0133319 A1 | 7/2004 | Pillar et al. |
| 2004/0155426 A1 | 8/2004 | Wen et al. |
| 2005/0234622 A1 | 10/2005 | Pillar et al. |
| 2005/0236226 A1 | 10/2005 | Salmi et al. |
| 2005/0247524 A1 * | 11/2005 | Wissler .................. E06C 5/04 182/207 |
| 2006/0021764 A1 | 2/2006 | Archer et al. |
| 2006/0022001 A1 | 2/2006 | Linsmeier et al. |
| 2006/0032701 A1 | 2/2006 | Linsmeier et al. |
| 2006/0032702 A1 | 2/2006 | Linsmeier et al. |
| 2006/0070845 A1 | 4/2006 | Crookston |
| 2006/0086566 A1 | 4/2006 | Linsmeier et al. |
| 2006/0213672 A1 | 9/2006 | Mohr |
| 2007/0205053 A1 * | 9/2007 | Isham .................. B29C 43/003 182/207 |
| 2007/0256842 A1 | 11/2007 | Mohr |
| 2007/0284156 A1 | 12/2007 | Grady et al. |
| 2008/0059030 A1 | 3/2008 | Quigley et al. |
| 2008/0099212 A1 | 5/2008 | Do |
| 2008/0103651 A1 | 5/2008 | Pillar et al. |
| 2008/0215700 A1 | 9/2008 | Pillar et al. |
| 2008/0271901 A1 | 11/2008 | Decker |
| 2009/0101436 A1 * | 4/2009 | Burman .................. E06C 7/08 182/69.4 |
| 2009/0218108 A1 | 9/2009 | Cano |
| 2010/0200328 A1 | 8/2010 | Savard et al. |
| 2012/0193109 A1 | 8/2012 | Moore et al. |
| 2014/0048353 A1 | 2/2014 | Ellis |
| 2014/0238704 A1 | 8/2014 | Moore et al. |
| 2014/0334169 A1 | 11/2014 | Ewert |
| 2015/0096835 A1 | 4/2015 | Hong et al. |
| 2015/0120152 A1 | 4/2015 | Lauterjung et al. |
| 2015/0273252 A1 | 10/2015 | Lenz et al. |
| 2015/0273253 A1 | 10/2015 | Lenz et al. |

FOREIGN PATENT DOCUMENTS

| | | |
|---|---|---|
| EP | 0 244 668 | 11/1987 |
| JP | H11-239625 | 9/1999 |
| JP | 2008-297701 | 12/2008 |
| KR | 20110040306 | 4/2011 |
| KR | 101297477 | 8/2013 |

OTHER PUBLICATIONS

U.S. Appl. No. 09/123,8904, filed Jul. 28, 1998, Archer et al.
U.S. Appl. No. 09/364,690, filed Jul. 30, 1999, Kempen et al.
U.S. Appl. No. 10/171,075, filed Jun. 13, 2002, Archer et al.
U.S. Appl. No. 29/162,282, filed Jun. 13, 2002, Archer et al.
U.S. Appl. No. 29/1692,344, filed Jun. 13, 2002, Archer et al.
Anonymous, "New truck for Lincolnshire-Riverwoods," Chicago Area Fire Departments, Dec. 6, 2010, Retrieved from the Internet at http://chicagoareafire.com/blog/2010/12/06/ on Jan. 26, 2016, 5 pages as printed.
Firehouse, "Problems with single axle aerial trucks," Firehouse, Dec. 2, 2009, Retrieved from the Internet at http://www.firehouse.com/forums/t111822/ on Jan. 25, 2016, 15 pages as printed.
Rosenbauer, "Raptor Aerials" Oct. 2, 2014, Retrieved from the Internet at https://web.archive.org/web/20141002023939/http://rosenbaueramerica.com/media/documents/pdf/raptor_eng.pdf on Jan. 25, 2016, 6 pages as printed.

(56) References Cited

OTHER PUBLICATIONS

Rosenbauer, "Viper Aerials," Rosenbauer, Oct. 2, 2014, Retrieved from the Internet at https://web.archive.org/web/20141002023939/http://rosenbaueramerica.com/media/documents/pdf/viper_eng.pdf on Jan. 25, 2016, 8 pages as printed.
International Search Report and Written Opinion for PCT Application No. PCT/US2015/059984, mail date Feb. 10, 2016, 11 pages.
International Search Report and Written Opinion for PCT Application No. PCT/US2015/060034, mail date Feb. 4, 2016, 12 pages.
International Search Report and Written Opinion for PCT Application No. PCT/US2015/060035, mail date Feb. 10, 2016, 16 pages.
International Search Report and Written Opinion for PCT Application No. PCT/US2015/060036, mail date Feb. 9, 2016, 14 pages.
International Search Report and Written Opinion for PCT Application No. PCT/US2015/060038, mail date Feb. 22, 2016, 16 pages.
International Search Report and Written Opinion for PCT Application No. PCT/US2015/060040, mail date Feb. 9, 2016, 15 pages.
Non-Final Office Action on U.S. Appl. No. 14/552,283, mail date May 9, 2016, 8 pages.
Non-Final Office Action on U.S. Appl. No. 14/552,293 mail date May 10, 2016, 13 pages.
Notice of Allowance on U.S. Appl. No. 14/552,275 Dated Nov. 8, 2016, 10 pages.

\* cited by examiner

AERIAL LADDER FOR A FIRE APPARATUS

CROSS-REFERENCE TO RELATED PATENT APPLICATIONS

This application is a continuation of U.S. application Ser. No. 14/552,240, titled "Aerial Ladder for a Fire Apparatus, filed Nov. 24, 2014 and is related to U.S. application Ser. No. 14/552,252, titled "Quint Configuration Fire Apparatus," filed Nov. 24, 2014; U.S. application Ser. No. 14/552,260, titled "Turntable Assembly for a Fire Apparatus," filed Nov. 24, 2014; U.S. application Ser. No. 14/552,275, titled "Ladder Assembly for a Fire Apparatus," filed Nov. 24, 2014; U.S. application Ser. No. 14/552,283, titled "Pedestal and Torque Box Assembly for a Fire Apparatus," filed Nov. 24, 2014; and U.S. application Ser. No. 14/552,293, titled "Outrigger Assembly for a Fire Apparatus," filed Nov. 24, 2014, all of which are incorporated herein by reference in their entireties.

BACKGROUND

Aerial ladders may be provided on a mobile platform or a vehicle, such as a fire apparatus (e.g., a fire truck, etc.). Such aerial ladders are extendable structures having components that telescope relative to one another. Fire fighters may pivot and extend the aerial ladder upward and outward from the fire apparatus to advantageously elevate and position an end of the aerial ladder. By way of example, the end of the aerial ladder may include a nozzle, and positioning the nozzle may facilitate discharge of water therefrom. By way of another example, the end of the aerial ladder may include a platform or basket, and positioning the end of the aerial ladder may facilitate a rescue operation.

The aerial ladder is coupled to the fire apparatus at one end. When pivoted upward, the aerial ladder forms a cantilever structure that is subject to loading from the weight of the aerial ladder itself and to loading from any persons or equipment on the aerial ladder. Such loading causes deflection along the length of the aerial ladder. Aerial ladders are designed using materials and structural components that reduce deflection at the end of the aerial ladder.

SUMMARY

One embodiment relates to an aerial ladder assembly for a fire apparatus that includes a first truss member, a second truss member, and a plurality of rungs coupling the first truss member to the second truss member. The first truss member includes a first base rail, a first hand rail elevated from the first base rail, and a plurality of lacing members coupling the first base rail to the first hand rail. The second truss member includes a second base rail, a second hand rail elevated from the second base rail, and a plurality of lacing members coupling the second base rail to the second hand rail. The first truss member and the second truss member extend along a longitudinal direction, and the plurality of rungs extend across the longitudinal direction. The first truss member and the second truss member define a first zone and a second zone separated by a transition, and the first base rail and the second base rail have a first shape within the first zone and a second shape within the second zone.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an aerial ladder assembly is operable within a work envelope defined at least in part by a vertical extension height and a horizontal reach distance. The aerial ladder assembly has a structural truss design that reduces weight while improving vertical extension height and horizontal reach. Traditionally, a "Quint" configuration fire apparatus (e.g., a fire apparatus having a fire fighting ladder mounted on a single rear axle chassis, etc.) has a vertical extension height of 75-80 feet and 67-72 feet of horizontal reach. Traditionally, increasing extension height or horizontal reach requires increasing the weight of the aerial ladder assembly and supporting the aerial ladder assembly with a tandem rear axle chassis. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. According to an exemplary embodiment of the present Application, the aerial ladder assembly has a vertical extension height of at least 95 feet (e.g., 105 feet, 107 feet, etc.) and at least 90 feet (e.g., at least 100 feet, etc.) of horizontal reach with a tip capacity of at least 750 pounds and may be supported by a single rear axle chassis.

Figure 1:
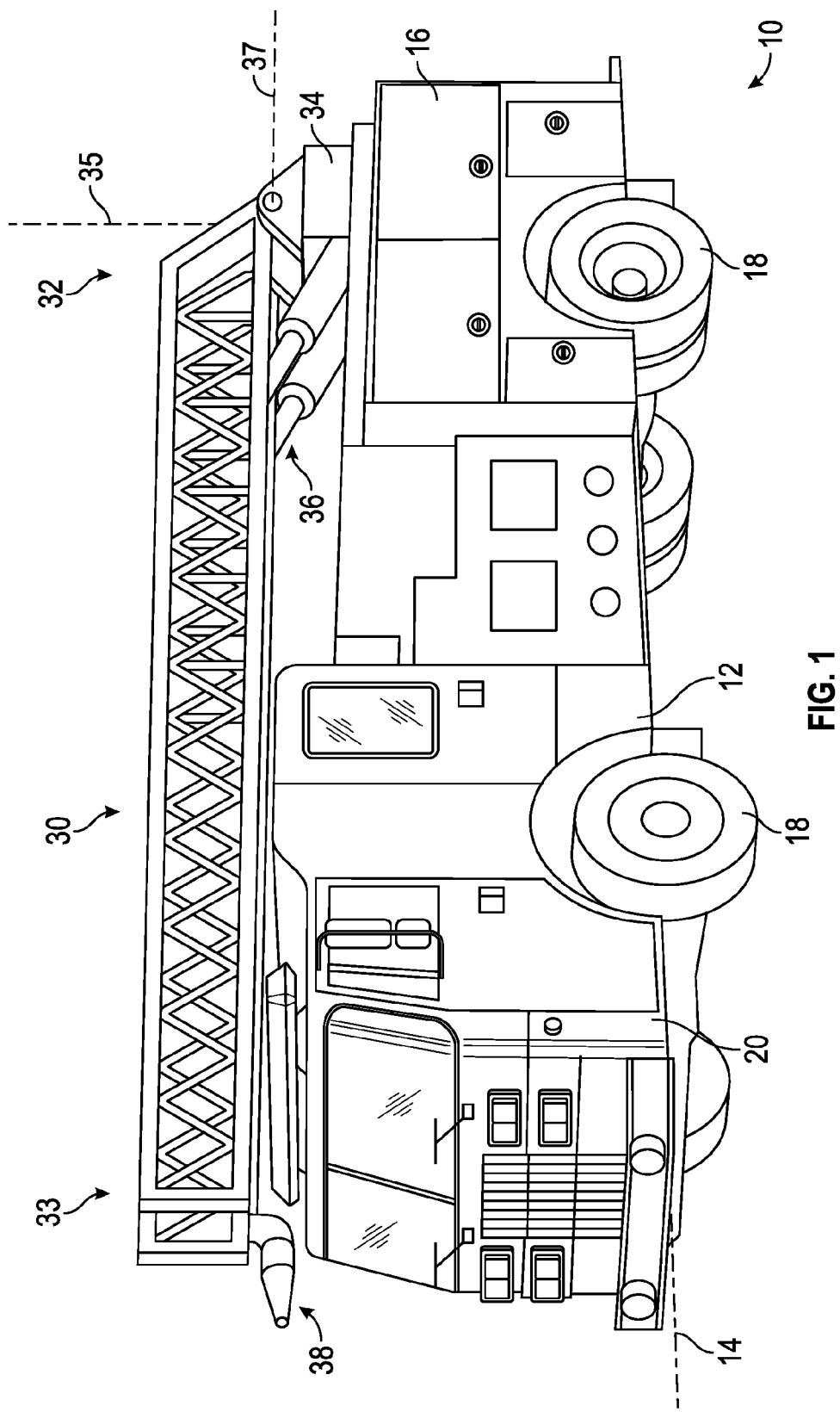
FIG. 1 is a front perspective view of a fire apparatus, according to an exemplary embodiment.

According to the exemplary embodiment shown in FIG. 1, a vehicle, shown as a fire apparatus 10, includes a chassis, shown as a frame 12, that defines a longitudinal axis 14. A body assembly, shown as rear section 16, axles 18, and a cab assembly, shown as front cabin 20, are coupled to frame 12. In one embodiment, the longitudinal axis 14 is generally aligned with a frame rail of the fire apparatus 10 (e.g., front to back, etc.).

Referring still to the exemplary embodiment shown in FIG. 1, the front cabin 20 is positioned forward of the rear section 16 (e.g., with respect to a forward direction of travel for the vehicle along the longitudinal axis 14, etc.). According to an alternative embodiment, the cab assembly may be positioned behind the rear section 16 (e.g., with respect to a forward direction of travel for the vehicle along the longitudinal axis 14, etc.). The cab assembly may be positioned behind the rear section 16 on, by way of example, a rear tiller fire apparatus. In some embodiments, the fire apparatus 10 is a ladder truck with a front portion that includes the front cabin 20 pivotally coupled to a rear portion that includes the rear section 16.

As shown in FIG. 1, the fire apparatus 10 is an aerial truck that includes an aerial ladder assembly, shown as aerial ladder assembly 30. While shown attached to fire apparatus 10, aerial ladder assembly 30 may be coupled to various types of vehicles (e.g., rescue vehicles, defense vehicles, lift vehicles, etc.). Aerial ladder assembly 30 includes a first end 32 (e.g., base end, proximal end, pivot end, etc.) and a second end 33 (e.g., free end, distal end, platform end, implement end, etc.). While shown as a single ladder section, aerial ladder assembly 30 may include a plurality of extensible ladder sections and have a first end 32 and a second end 33. According to an exemplary embodiment, aerial ladder assembly 30 is coupled to frame 12 at first end 32. By way of example, aerial ladder assembly 30 may be directly coupled to frame 12 or indirectly coupled to frame 12 (e.g., with an intermediate superstructure, etc.). As shown in FIG. 1, the first end 32 of aerial ladder assembly 30 is coupled to a turntable 34. Turntable 34 may be directly or indirectly coupled to frame 12 (e.g., with an intermediate superstructure, via rear section 16, etc.). According to an exemplary embodiment, turntable 34 rotates relative to the frame 12 about a generally vertical axis 35. According to an exemplary embodiment, the turntable 34 is rotatable a full 360 degrees relative to the frame 12. In other embodiments, the rotation of the turntable 34 relative to the frame 12 is limited to a range less than 360 degrees or the turntable 34 is fixed relative to the frame 12. According to the exemplary embodiment shown in FIG. 1, the turntable 34 is positioned at the rear end of the rear section 16 (e.g., rear mount, etc.). In other embodiments, the turntable 34 is positioned at the front end of the rear section 16, proximate the front cabin 20 (e.g., mid mount, etc.). In still other embodiments, the turntable 34 is disposed along front cabin 20 (e.g., front mount, etc.).

According to the exemplary embodiment shown in FIG. 1, first end 32 is pivotally coupled to the turntable 34 such that the aerial ladder assembly 30 may be rotated about a generally horizontal axis 37 with an actuator, shown as hydraulic cylinder 36. The actuator may be a linear actuator, a rotary actuator, or still another type of device and may be powered hydraulically, electrically, or still otherwise powered. In one embodiment, aerial ladder assembly 30 is rotatable between a generally horizontal lowered position (e.g., the position shown in FIG. 1, etc.) and a raised position. In one embodiment, extension and retraction of hydraulic cylinders 36 rotates aerial ladder assembly 30 about the horizontal axis 37 and raises or lowers, respectively, the second end 33 of aerial ladder assembly 30. In the raised position, the aerial ladder assembly 30 allows access between the ground and an elevated height for a fire fighter or a person being aided by the fire fighter.

Referring still to the exemplary embodiment shown in FIG. 1, an implement, shown as nozzle 38 (e.g., deluge gun, water cannon, deck gun, etc.) is disposed at the second end 33 of the aerial ladder assembly 30. The nozzle 38 is connected to a water source at ground level via intermediate conduit extending along the aerial ladder assembly 30 (e.g., along the side of the aerial ladder assembly 30, beneath the aerial ladder assembly 30, in a channel provided in the aerial ladder assembly 30, etc.). By pivoting the aerial ladder assembly 30 to the raised position, the nozzle 38 may be elevated to expel water from a higher elevation and facilitate suppressing a fire. In some embodiments, the second end 33 of the aerial ladder assembly 30 includes a basket. The basket may be configured to hold at least one of fire fighters and persons being aided by the fire fighters. The basket provides a platform from which a fire fighter may complete various tasks (e.g., operate the nozzle 38, create ventilation, overhaul a burned area, perform a rescue operation, etc.).

In some embodiments, aerial ladder assembly 30 is extendable and includes a plurality of sections that may be actuated between an extended configuration and a retracted configuration. By way of example, aerial ladder assembly 30 may include multiple, nesting sections that telescope with respect to one another. In the extended configuration (e.g., deployed position, use position, etc.), the aerial ladder assembly 30 is lengthened, and the second end 33 is extended away from the first end 32. In the retracted configuration (e.g., storage position, transport position, etc.), the aerial ladder assembly 30 is shortened to withdraw the second end 33 towards the first end 32.

The aerial ladder assembly 30 forms a cantilever structure. According to the exemplary embodiment shown in FIG. 1, aerial ladder assembly 30 is supported by the hydraulic cylinders 36 and by the turntable 34 at the first end 32. The aerial ladder assembly 30 supports static loading from its own weight, the weight of any equipment coupled to the ladder (e.g., the nozzle 38, a water line coupled to the nozzle, a platform, etc.), and the weight of any persons using the ladder. Aerial ladder assembly 30 may also be subjected to various dynamic loads (e.g., due to forces imparted by a fire fighter climbing aerial ladder assembly 30, wind loading, loading due to rotation, elevation, or extension of aerial ladder assembly, etc.). Such static and dynamic loads are carried by aerial ladder assembly 30. The forces carried by the hydraulic cylinders 36, the turntable 34, and frame 12 may be proportional (e.g., directly proportional, etc.) to the length of the aerial ladder assembly 30. Increasing at least one of the extension height rating, the horizontal reach rating, the static load rating, and the dynamic load rating traditionally increases the weight of aerial ladder assembly 30, the weight of turntable 34, or the weight of hydraulic cylinders 36, among other components, and traditionally requires the use of a chassis having two rear axles. Aerial ladder assembly 30 has an increased extension height rating and horizontal reach rating without requiring a chassis having two rear axles (e.g., a tandem axle assembly, etc.), according to an exemplary embodiment. Aerial ladder assembly 30 described herein has an improved strength to weight ratio, thereby allowing for an aerial ladder assembly 30 having an increased extension height an horizontal reach to be utilized on the fire apparatus 10 having a single rear axle 18. Fire apparatus 10 having a single rear axle 18 is smaller, lighter, more maneuverable, and less expensive to manufacture than fire apparatuses having two rear axles. According to an exemplary embodiment, the aerial ladder assembly 30 for the fire apparatus 10 has an extension height rating of at least 95 feet (e.g., 105 feet, 107 feet, etc.) and a horizontal reach rating of at least 90 feet (e.g., at least 100 feet, etc.).

Figure 2:
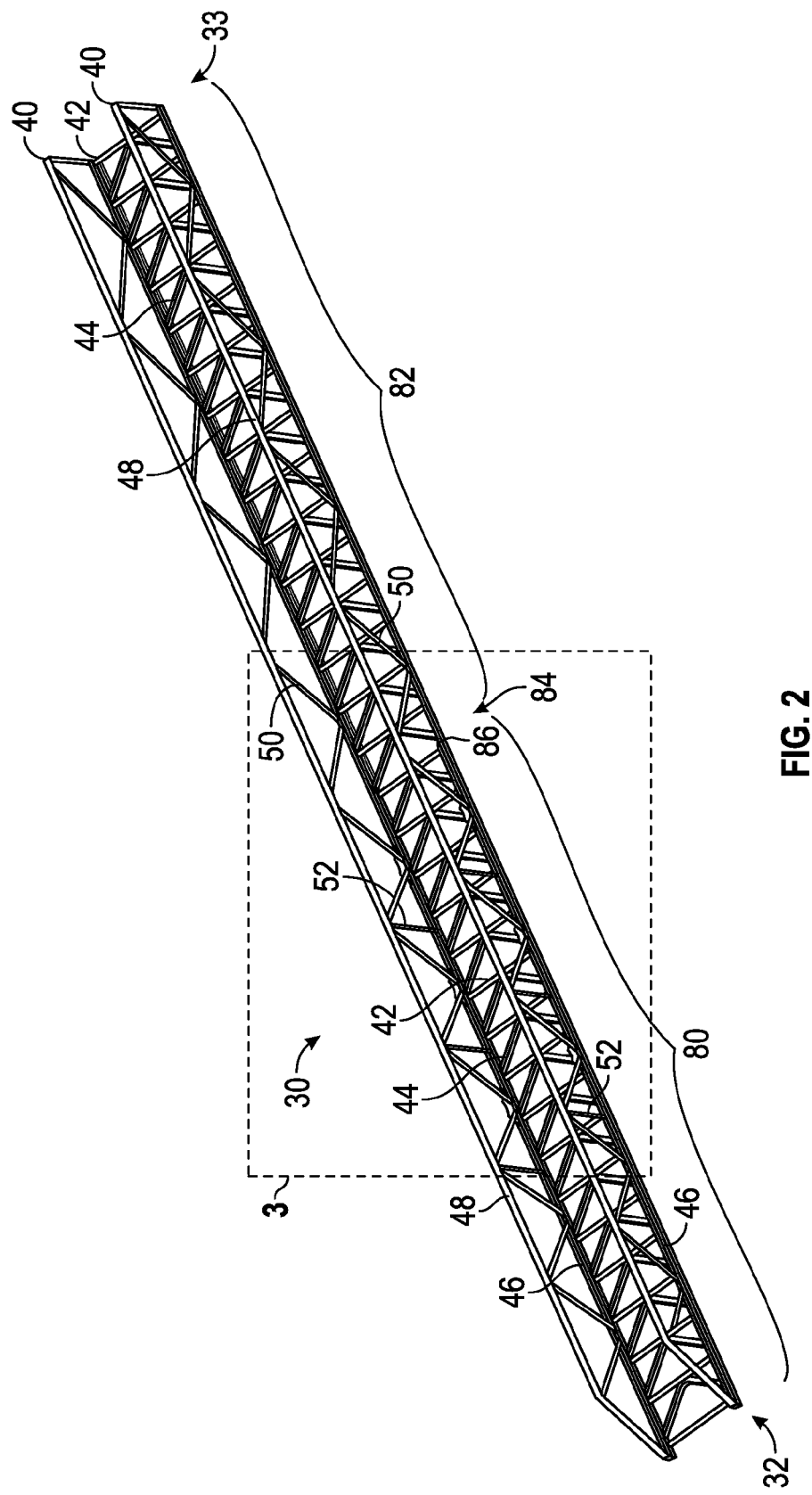
FIG. 2 is a perspective view of a ladder assembly for a fire apparatus, according to an exemplary embodiment.
Figure 3:
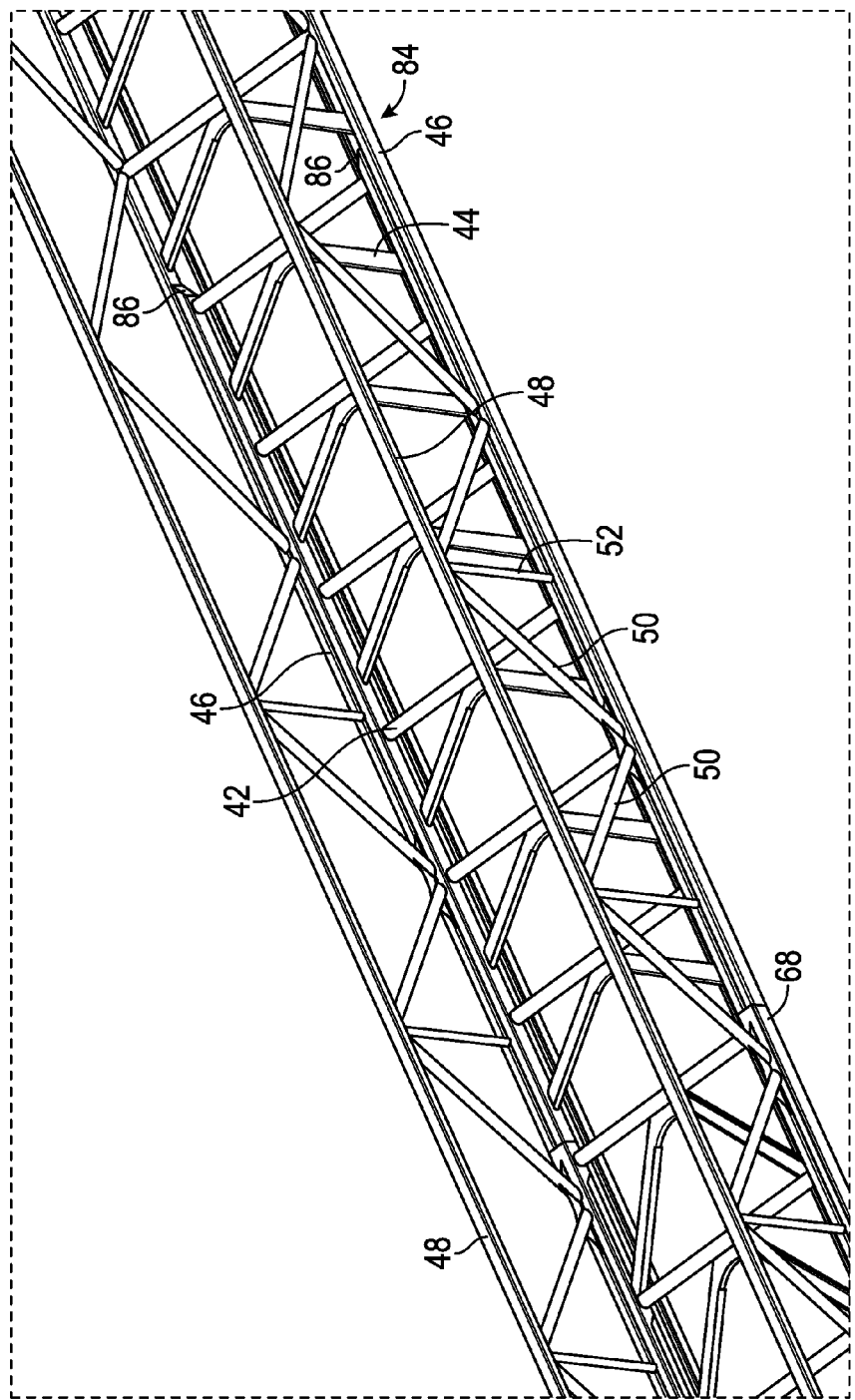
FIG. 3 is a detail perspective view of a ladder assembly of FIG. 2.
Figure 4:
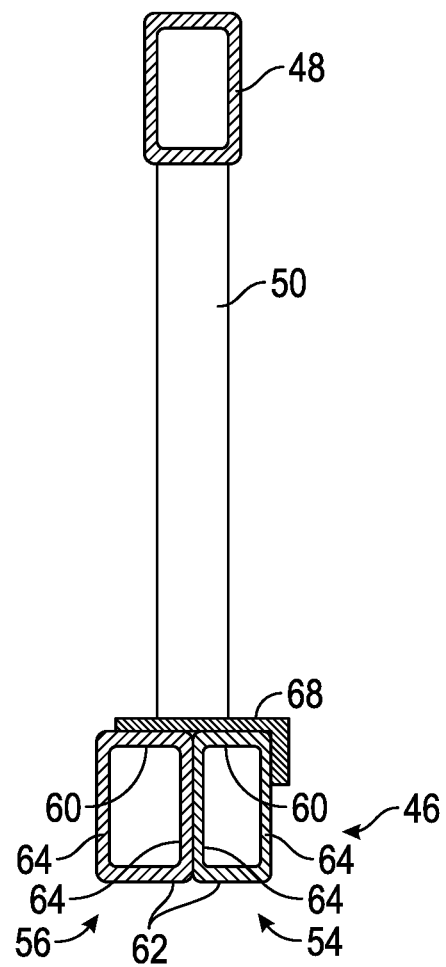
FIG. 4 is a sectional view of a truss member of the ladder assembly of FIG. 2.

Referring next to FIGS. 2-4, the aerial ladder assembly 30 includes a plurality of structural members. In some embodiments, the aerial ladder assembly 30 is a section (e.g., a fly section, etc.) of a telescoping ladder. According to the exemplary embodiment shown in FIGS. 2-4, aerial ladder assembly 30 includes a pair of truss members, shown as truss members 40. Truss members 40 are structural members, according to an exemplary embodiment, that carry static and dynamic loading experienced by aerial ladder assembly 30. In one embodiment, truss members 40 are generally parallel and extend along a longitudinal direction. As shown in FIGS. 2-4, a plurality of cross members, shown as rungs 42, couple the first truss member 40 to the second truss member 40. In one embodiment, rungs 42 extend laterally between truss members 40 (e.g., across the longitudinal direction along which truss members 40 extend, etc.). As shown in FIGS. 2-4, rungs 42 are supported by braces, shown as rung supports 44.

According to an exemplary embodiment, the truss members 40 each include a lower longitudinal member, shown as base rail 46 (e.g., lower rail, bottom rail, etc.), and an upper longitudinal member, shown as hand rail 48 (e.g., upper rail, top rail, etc.). As shown in FIGS. 2-4, base rails 46 are separated an offset distance from one another, and hand rails 48 are elevated relative to base rails 46. The base rails 46 are coupled to the hand rails 48 by a plurality of supports, shown as lacing members 50 and lacing members 52. As shown in FIGS. 2-4, lacing members 50 are angled relative to base rails 46 and hand rails 48. Lacing members 52 are perpendicular to base rails 46 and hand rails 48, according to an exemplary embodiment. In one exemplary embodiment, truss members 40 are generally vertically oriented, with each base rail 46 and corresponding hand rail 48 extending within the same vertical planes. According to an alternative embodiment, truss members 40 are inclined relative to one another (e.g., disposed at an offset angle relative to one another, etc.), such that the distance between the base rails 46 of the truss members 40 is different than the distance between the hand rails 48 of the truss members 40.

As shown in the sectional view of FIG. 4, truss member 40 includes a plurality of tubular components. According to an exemplary embodiment, hand rail 48 is a hollow, tubular member. Hand rail 48 may be a single, continuous tubular element or may include a plurality of tubular elements that are coupled (e.g., welded, etc.) end-to-end. As shown in FIG. 4, hand rail 48 includes a tubular member having a rectangular cross sectional shape. In other embodiments, hand rail 48 has a different cross sectional shape (e.g., round, oval, hexagonal, etc.). In still other embodiments, hand rail 48 includes a different arrangement of structural components (e.g., a pair of tubular members, a solid angle element, a solid channel, a bar, etc.).

Referring still to FIG. 4, base rail 46 includes a first member 54 and a second member 56. According to the exemplary embodiment shown in FIG. 4, first member 54 is disposed inward of second member 56 (e.g., first member 54 is disposed closer to a centerline of aerial ladder assembly 30, etc.). As shown in FIG. 4, first member 54 and second member 56 are hollow rectangular tubes. In one embodiment, first member 54 and second member 56 each have two side walls 64 extending between a top wall 60 and a bottom wall 62. According to an exemplary embodiment, the first member 54 and is positioned along the second member 56 such that a side wall 64 of the first member 54 abuts a side wall 64 of the second member 56. In some embodiments, the side walls 64 of the first member 54 and the second member 56 are welded together along an interface of the side walls 64. By way of example, the first member 54 and the second member 56 may be welded together along a joint at the top or bottom of the side walls 64. In other embodiments, the first member 54 and the second member 56 are welded together along top walls 60 or bottom walls 62 (e.g., with spot welds, etc.). Using thin-walled rectangular tubular components reduces the cost of aerial ladder assembly 30.

Referring again to FIG. 2, the aerial ladder assembly 30 has a first zone 80 and a second zone 82 separated by a transition point 84. According to an exemplary embodiment, base rails 46 have a shape (e.g., cross sectional shape, cross sectional area, thickness of material for the structural components, number of structural components, etc.) that corresponds to a particular length or length range along aerial ladder assembly 30. The shape of base rails 46 may vary along the length of aerial ladder assembly 30. By way of example, the base rails 46 may have a first shape within first zone 80 and a second shape within second zone 82. Such base rails 46 may be tuned to the particular loading experienced by the particular length or length range of aerial ladder assembly 30. According to an exemplary embodiment, the first zone 80 is proximate to the first end 32 of the aerial ladder assembly 30 and the second zone 82 is proximate the second end 33 of the aerial ladder assembly 30. In one embodiment, the base rails 46 along first zone 80 include both the first member 54 and second member 56 while the base rails 46 along the second zone 82 include only one rail (e.g., the first member 54, etc.). By way of example, the first member 54 may continue along both the first zone 80 and the second zone 82 of each the truss member 40. One of the rails (e.g., the second member 56, etc.) may terminate at the transition point 84 between the first zone 80 and the second zone 82. As shown in FIG. 2, the second member 56 tapers to an end 86 at the transition point 84.

In one embodiment, the aerial ladder assembly 30 is unsupported at the second end 33. The bending moments generated by the various loads imparted on the aerial ladder assembly 30 are smaller at second end 33 and larger at first end 32, where the aerial ladder assembly 30 is coupled to the turntable 34 and to the hydraulic cylinders 36. According to an exemplary embodiment, base rails 46 include two tubular elements (e.g., first member 54 and second member 56, etc.) to carry the increased bending moment experienced by first zone 80 of aerial ladder assembly 30. Aerial ladder assembly 30 having base rails 46 that include a single tubular element (e.g., only first member 54, etc.) along second zone 82 has an increased strength-to-weight ratio.

Figure 5:
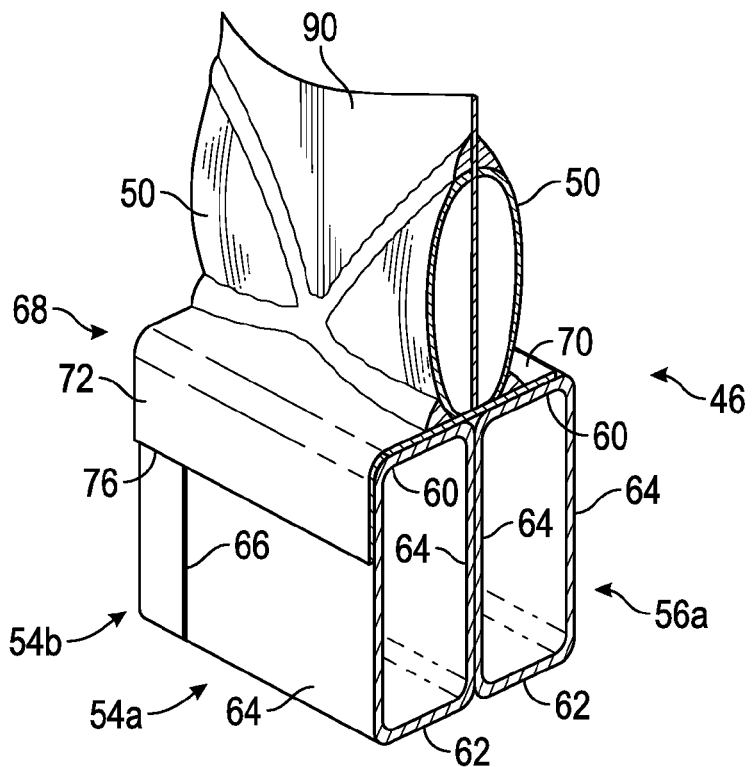
FIG. 5 is a perspective view of a section of a lower longitudinal member of the ladder assembly of FIG. 2.
Figure 6:
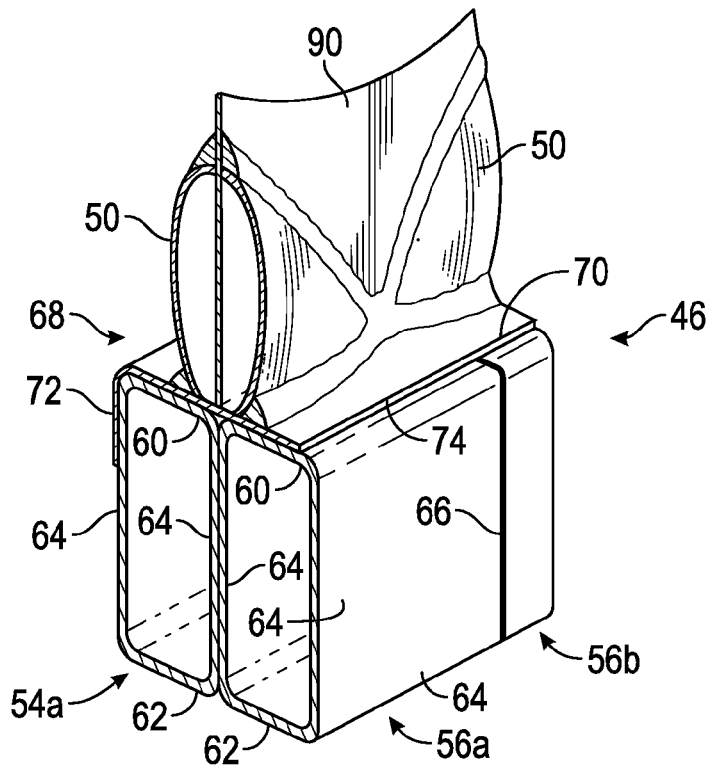
FIG. 6 is a perspective view of a section of a lower longitudinal member of the ladder assembly of FIG. 2.

Referring next to FIGS. 5-6, base rails 46 include various components that are coupled (e.g., welded, etc.) together. According to an exemplary embodiment, at least one of the first member 54 and the second member 56 include a plurality of components that are positioned end-to-end. By way of example, first member 54 may include a first section 54a and a second section 54b while second member 56 may include a first section 56a and a second section 56b. The various portions of first member 54 and second member 56 may have lengths that are shorter than the overall length of base rails 46. As shown in FIGS. 5-6, a brace, shown as brace 68, is disposed at a union 66 of the first and second portions of first member 54 and second member 56. The brace 68 is positioned along the top walls 60 of first member 54 and second member 56 and spans union 66, according to an exemplary embodiment. As shown in FIGS. 5-6, brace 68 has an "L"-shaped cross-section and includes a top plate 70 and a side leg 72. In one embodiment, side leg 72 is angularly offset (e.g., ninety degrees, etc.) relative to top plate 70. Side leg 72 may facilitate positioning brace 68 atop first member 54 and second member 56, thereby simplifying manufacturing. In one embodiment, brace 68 is manufactured by bending a sheet of material to form top plate 70 and side leg 72. As shown in FIGS. 5-6, the brace 68 is positioned such that the top plate 70 abuts the top walls 60 of the first member 54 and the second member 56 and the side leg 72 abuts the outer side wall 64 of the first member 54. According to an exemplary embodiment, the brace 68 has a width that is approximately equal to the combined widths of the first member 54 and the second member 56 such that a distal edge 74 of the top plate 70 does not extend beyond the outer side wall 64 of the first member 54 when the brace 68 is positioned on the first member 54 and the second member 56. The side leg 72 has a height that is less than the height of the first member 54 to minimize the weight of the brace 68 and the overall weight of the aerial ladder assembly 30. In other embodiments, the side leg 72 may have a height that is approximately equal to the height of the first member 54. In another embodiment, the brace 68 may be positioned with the side leg 72 oriented along the inner side wall 64 of the second member 56. In other embodiments, the brace 68 may have a second side leg opposite the side leg 72 that is configured to extend along the inner side wall 64 of the second member 56.

According to an exemplary embodiment, brace 68 facilitates manufacturing aerial ladder assembly 30. By way of example, the brace 68 may be used in the manufacturing process as a fixture to position the first member 54 and second member 56 relative to one other. In an exemplary embodiment, the first section 54a and the second section 54b of first member 54 are positioned against the top plate 70 and the side leg 72 of the brace 68. The first section 54a and the second section 54b of first member 54 may then be coupled (e.g., welded, etc.) together and/or coupled to the brace 68. The first section 56a and the second section 56b of second member 56 may then be positioned against the side walls 64 of the first section 54a and the second section 54b of first member 54 and against the top plate 70 of the brace 68. The first section 56a and the second section 56b of second member 56 may then be at least one of coupled together, coupled to the brace 68, and coupled to the first member 54.

The brace 68 may be coupled to the first section 54a and the second section 54b of first member 54 with a weld along a distal edge 76 of the side leg 72. The weld may be continuous and extend along the length of the brace 68 or may include a plurality of intermittent welds (e.g., skip welds, etc.). According to an exemplary embodiment, the brace 68 is coupled to the first section 56a and the second section 56b of second member 56 along the distal edge 74 of the top plate 70. The weld may be continuous and extend along the length of the brace 68 or may include a plurality of intermittent welds (e.g., skip welds, etc.).

Figure 7:
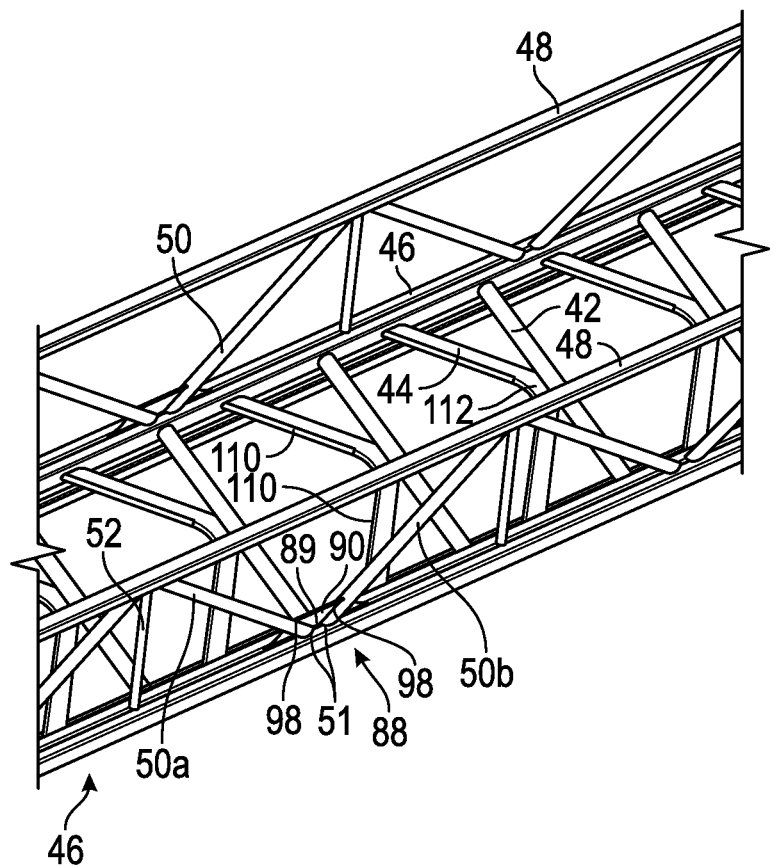
FIG. 7 is a detail perspective view of the ladder assembly of FIG. 2.
Figure 8:
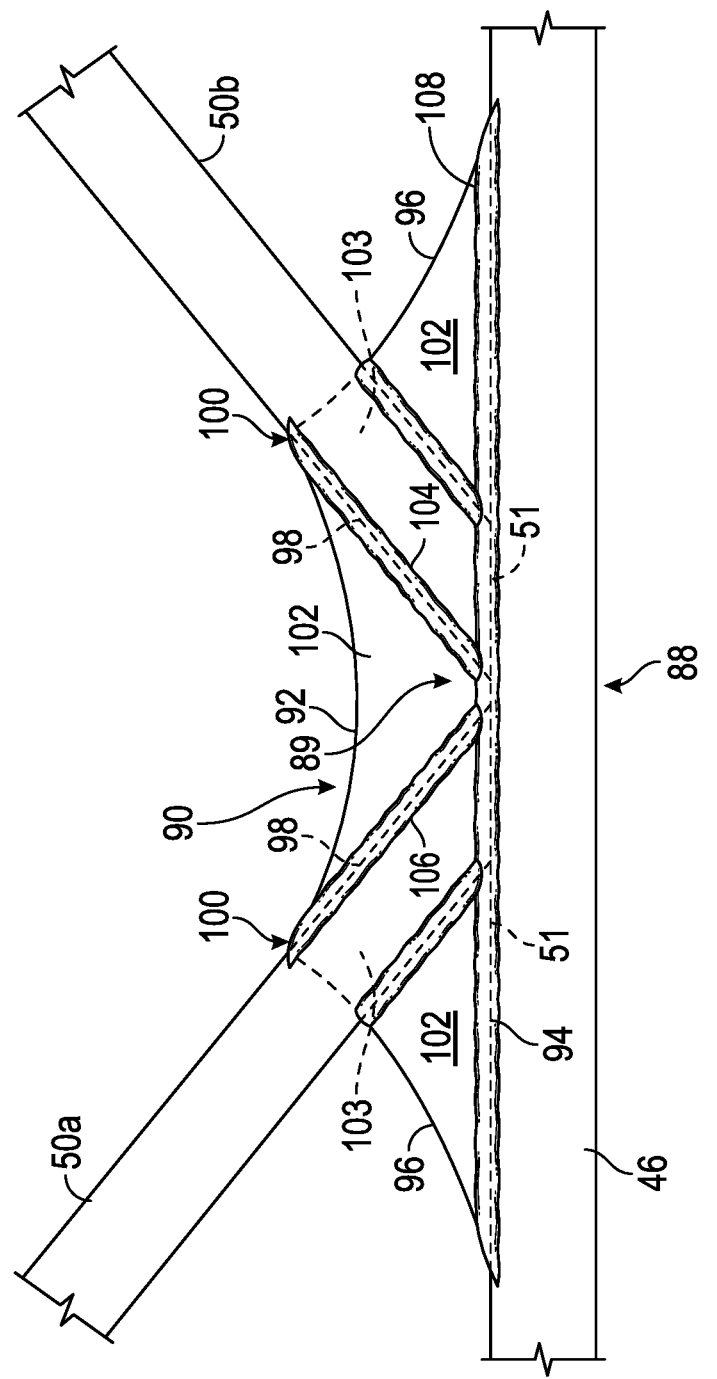
FIG. 8 is a side plan view of the ladder assembly of FIG. 2.

Referring next to FIGS. 7-8, the lacing members 50 and the lacing members 52 couple the hand rails 48 to the base rails 46. According to an exemplary embodiment, lacing members 50 include lacing members 50a and lacing members 50b. As shown in FIGS. 7-8, lacing members 50 extend between hand rails 48 and base rails 46. In one embodiment, lacing members 50 include ends 51 that abut base rails 46. Ends 51 of lacing members 50 are coupled to base rails 46, according to an exemplary embodiment. The lacing members 50a and 50b alternate along the length of the aerial ladder assembly 30, with the ends 51 of the lacing members 50a and 50b meeting at a plurality of common interfaces, shown as joints 88. As shown in FIGS. 7-8, joints 88 are disposed along base rails 46 at regular intervals. In other embodiments, the spacing between joints 88 may be non-uniform along the length of aerial ladder assembly 30. In some embodiments, lacing members 52 are provided at one or more of the joints 88.

According to an exemplary embodiment, aerial ladder assembly 30 includes lacing members 50 and the lacing members 52 that are manufactured from thin-walled tubular members. Such an aerial ladder assembly 30 may have a reduced overall weight. In one embodiment, the arrangement of the various components of aerial ladder assembly 30 facilitate such construction without sacrificing load, vertical extension, or horizontal reach ratings. The lacing members 50 and the lacing members 52 may have a similar cross-sectional shape or may have different cross-sectional shapes. According to an exemplary embodiment, lacing members 50 are circular tubes and lacing members 52 are circular tubes. In other embodiments, the lacing members 50 and lacing members 52 may be otherwise shaped. By way of example, the lacing members 50 and the lacing members 52 may be tubes with a rectangular or hexagonal cross-sectional shape. In still other embodiments, the lacing members may be other structural members (e.g., angles, channels, rods, etc.). The size and/or shape of the lacing members 50 and the lacing members 52 may vary along the length of the aerial ladder assembly 30.

Referring still to the exemplary embodiment shown in FIGS. 5-6 and 7-8, the joints 88 between the lacing members 50 and the base rails 46 include reinforcing members, shown as gussets 90. According to an exemplary embodiment, gusset 90 is a flat plate. As shown in FIG. 8, gusset 90 is generally trapezoidal and includes an upper edge 92, a lower edge 94, and two sides 96. According to an exemplary embodiment, the lower edge 94 of gusset 90 is positioned along (e.g., abuts, contacts, engages, interfaces with, etc.) the base rail 46. In one embodiment, the lower edge 94 of gusset 90 is disposed along a brace 68 positioned at a joint 88. In another embodiment, the lower edge 94 of gusset 90 is disposed along the top wall 60 of the first member 54 and/or the second member 56.

According to an exemplary embodiment, gusset 90 is a continuous body extending from base rail 46 upward into engagement with lacing members 50. As shown in FIG. 7, lacing members 50 define a plurality of apertures (e.g., slots, grooves, slits, etc.), shown as slots 98 that receive gusset 90. Gusset 90 may extend entirely through lacing member 50 and into direct engagement with base rail 46. In one exemplary embodiment, the plurality of slots 98 are formed in the lacing members 50 by laser cutting. In other embodiments, the plurality of slots 98 are otherwise formed (e.g., water jet cut, machined, etc.) in the lacing members 50. Intact portions of lacing members 50 pass around the gusset 90 and terminate at ends 51. In one embodiment, ends 51 are positioned along (e.g., abut, contact, engage, interface with, etc.) the base rail 46. In one embodiment, the ends 51 are disposed along a brace 68 positioned at a joint 88. In another embodiment, the ends 51 are disposed along the top wall 60 of the first member 54 and/or the second member 56. As shown in FIGS. 7-8, the ends 51 of the lacing members 50 may be separated by a gap 89. According to an exemplary embodiment, ends 51 of lacing members 50 and lower edge 94 of gusset 90 contact base rail 46, thereby directly transferring loading and stresses between base rail 46 and lacing members 50. In one embodiment, an aerial ladder assembly 30 having a gusset 90 that extends through lacing members 50 defines additional load paths not present in traditional ladder assemblies.

As shown in FIG. 8, the upper edge 92 spans the space between the lacing members 50. The sides 96 span the space between the lacing members 50 and the base rail 46. According to an exemplary embodiment, the upper edge 92 and the sides 96 may be inwardly curved (e.g., scalloped, etc.). The upper edge 92 and the sides 96 may approach the surface of the lacing members 50 at a relatively shallow angle, such that the corners 100 of the exposed portions 102 of the gusset 90 approach an angle of 180 degrees. In one embodiment, gusset 90 having an inwardly curved upper edge 92 and sides 96 improves load transfer between base rail 46 and lacing members 50.

The gusset 90 is coupled to the lacing members 50 with welds 104 and welds 106. In one embodiment, welds 104 and welds 106 continue along a first side of the gusset 90, around a corner 100 of gusset 90, and along an opposing second side of the gusset 90. In some embodiments, welds 104 and 106 may not extend around the corners 100 but may instead comprise separate welds formed on either side of the gusset 90. In one embodiment, the gusset 90 defines a single unitary body that extends from upper edge 92, through outer surface of the lacing members 50 (e.g., into the slot 98, etc.), and to a concealed portion 103 within the lacing member 50. Gusset 90 further extends downward from concealed portion 103 to base rail 46. In one embodiment, the single unitary body defines a continuous load path between the various components of aerial ladder assembly 30. Gusset 90 also reduces stress concentrations within the joint 88. The continuous extension of gusset 90 from upper edge 92 to concealed portion 103 also improves the likelihood that corners 100 will remain intact during a welding operation (e.g., to reduce the amount of corner 100 that is melted and assumed into the weld bead, etc.). A relatively smooth transition is therefore maintained between the upper edge 92 and the lacing members 50 and between the sides 96 and the lacing members 50, reducing the stress concentrations that may otherwise be formed between the lacing members 50 and the gusset 90. Such a reduction in stress concentrations facilitates a reduction in the weight of various components (e.g., lacing members 50, base rails 46, etc.), thereby reducing the weight of aerial ladder assembly 30.

The lacing members 50 and the gusset 90 are coupled to the base rail 46 with a weld 108. Weld 108 extends around the base of the joint 88, coupling the ends 51 of the lacing members 50 and the lower edge 94 of gusset 90 to the base rail 46. The weld 108 may couple the ends 51 of the lacing members 50 and the lower edge 94 to a brace 68 or directly to the top wall 60 of the first member 54 and/or the second member 56.

Because the gusset 90 passes through the lacing members 50 via the slots 98, stresses (e.g., sheer stresses, bending stresses, etc.) at the joint 88 can flow through the gusset 90 and directly into the base rail 46 instead of passing through the ends 51 of the lacing members 50. Aerial ladder assembly 30 may thereby include smaller lacing members 50 (e.g., smaller in diameter, smaller in wall thickness, etc.) than truss members having gussets 90 that do not pass through lacing members 50 or extend downward to base rail 46.

The configuration of the lacing members 50 and the gussets 90 also aids in the manufacturing of truss members 40 and the structural integrity of the joints 88. The slots 98 position the gusset 90 relative to the lacing members 50 along a preferred vertical plane (e.g., a vertical plane passing through the neutral axis of the lacing members 50, etc.). The slots 98 allow the gusset 90 to be accurately positioned relative to lacing members 50 without the use of an additional fixture. The slots 98 thereby reduce the risk that the gussets 90 will be welded in a skewed orientation (e.g., angled in a lateral direction, etc.).

Figure 9:
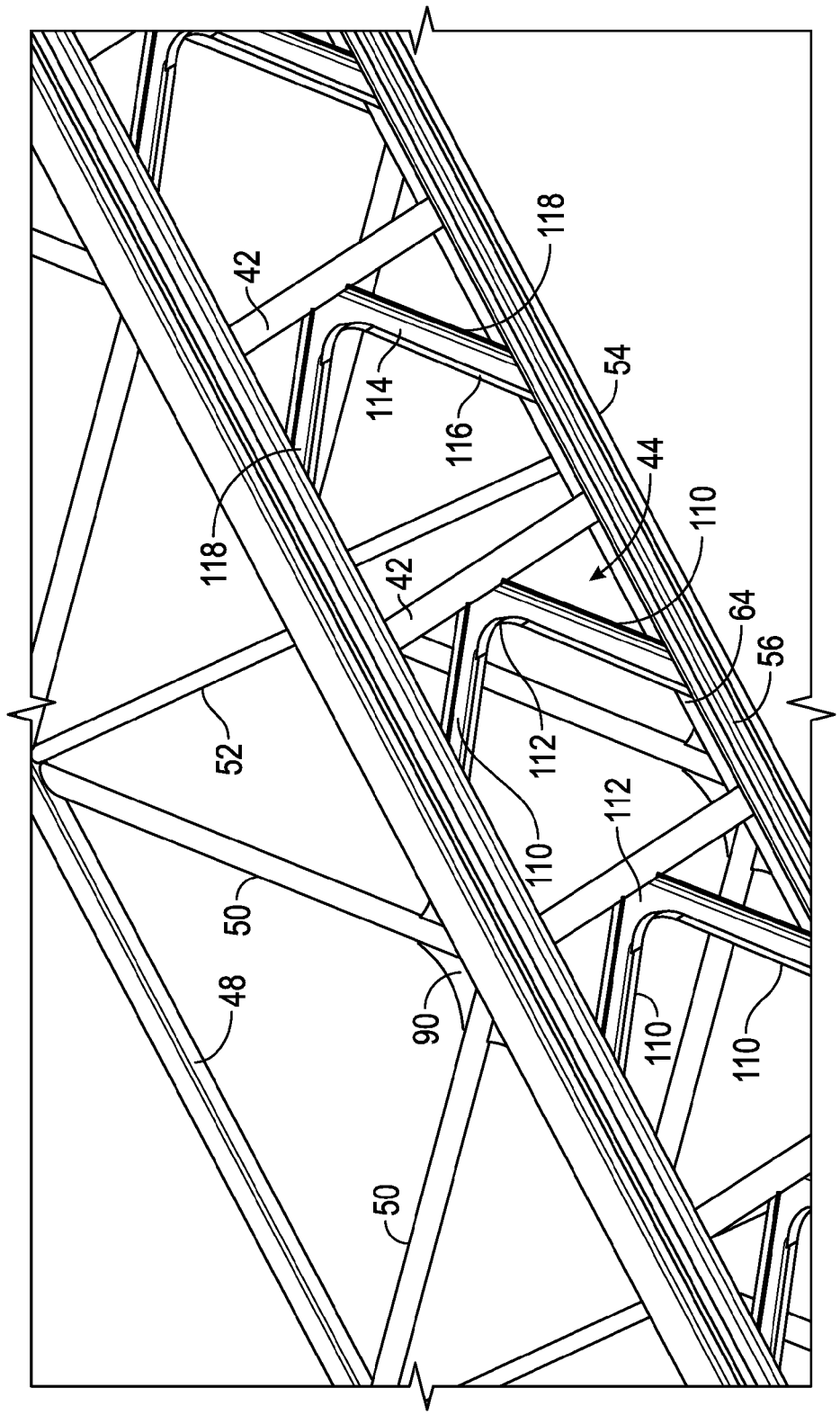
FIG. 9 is a detail lower perspective view of the ladder assembly of FIG. 2.

Referring to the exemplary embodiment shown in FIGS. 7 and 9, rungs 42 extend laterally between the base rails 46 of the truss members 40. The rungs 42 facilitate the ascent and descent of a fire fighter or a person being aided by the fire fighter along aerial ladder assembly 30. In an exemplary embodiment, the rungs 42 are coupled to the inner side wall 64 of the second members 56 of the truss members 40. In other embodiments, the rungs 42 are coupled to the top walls or the bottom walls of the first member 54 and the second member 56. The rungs 42 may also be coupled to braces 68 disposed along base rails 46.

In an exemplary embodiment, the rungs 42 are thin-walled, tubular members thereby reducing the weight of the aerial ladder assembly 30. Rungs 42 may have a cross-sectional shape (e.g., round, elliptical, D-shaped, etc.) that facilitates the engagement thereof (e.g., grasping, stepping, etc.) by a fire fighter or a person being aided by the fire fighter. Rung supports 44 strengthen aerial ladder assembly 30, according to an exemplary embodiment. In one embodiment, rung supports 44 are coupled to rungs 42. Rungs 42 and rung supports 44 may define a plurality of braces (e.g., K-braces, etc.) that couple the truss members 40 together. The rung supports 44 are a V-shaped members that are coupled to the rungs 42 at a point between the two truss members 40. In an exemplary embodiment, the rung supports 44 are positioned rearward of (e.g., toward the first end 32 relative to, etc.) the rungs 42. The rung supports 44 include a pair of arms 110 extending between the rungs 42 and base rails 46. In one embodiment, the arms 110 are connected by a transition portion 112 that is coupled (e.g., welded, etc.) to the rung 42. In other embodiments, the rung supports 44 may not include the transition portions 112, and the arms 110 may be separate members that are coupled directly to the rungs 42. As shown in FIG. 9, the distal ends of the arms 110 are coupled to the base rails 46.

In an exemplary embodiment, rung supports 44 are formed from a plate with one or more bending operations. As shown in FIG. 9, the rung supports 44 include a main body 114, a first flange 116 that extends downward from a rearward edge of the main body 114, and a pair of flanges 118 that extend downward form a forward edge of the main body 114. The rung supports 44 have a reduced weight compared to a brace formed of thin-walled tubular members or other traditional designs while providing lateral strength and stiffness to the aerial ladder assembly 30. In other embodiments, the rung supports 44 are thin-walled tubular members. The size and shape of the rung supports 44 (e.g., wall thickness, width of the main body, height of the flanges 106 and 108, angle of the arms 110, etc.) may vary along the length of the ladder. For example, the rung supports 44 provided along the first zone 80 of the aerial ladder assembly 30 may be configured to resist greater lateral forces than the rung supports 44 provided along the second zone 82 of the aerial ladder assembly 30. Aerial ladder assembly 30 has a reduced weight due to the configuration of rung supports 44 (e.g., the weight of the rung supports 44 and the weight of the aerial ladder assembly 30 is reduced by not configuring all of the rung supports 44 to be capable of supporting the maximum lateral forces, etc.).

Figure 10:
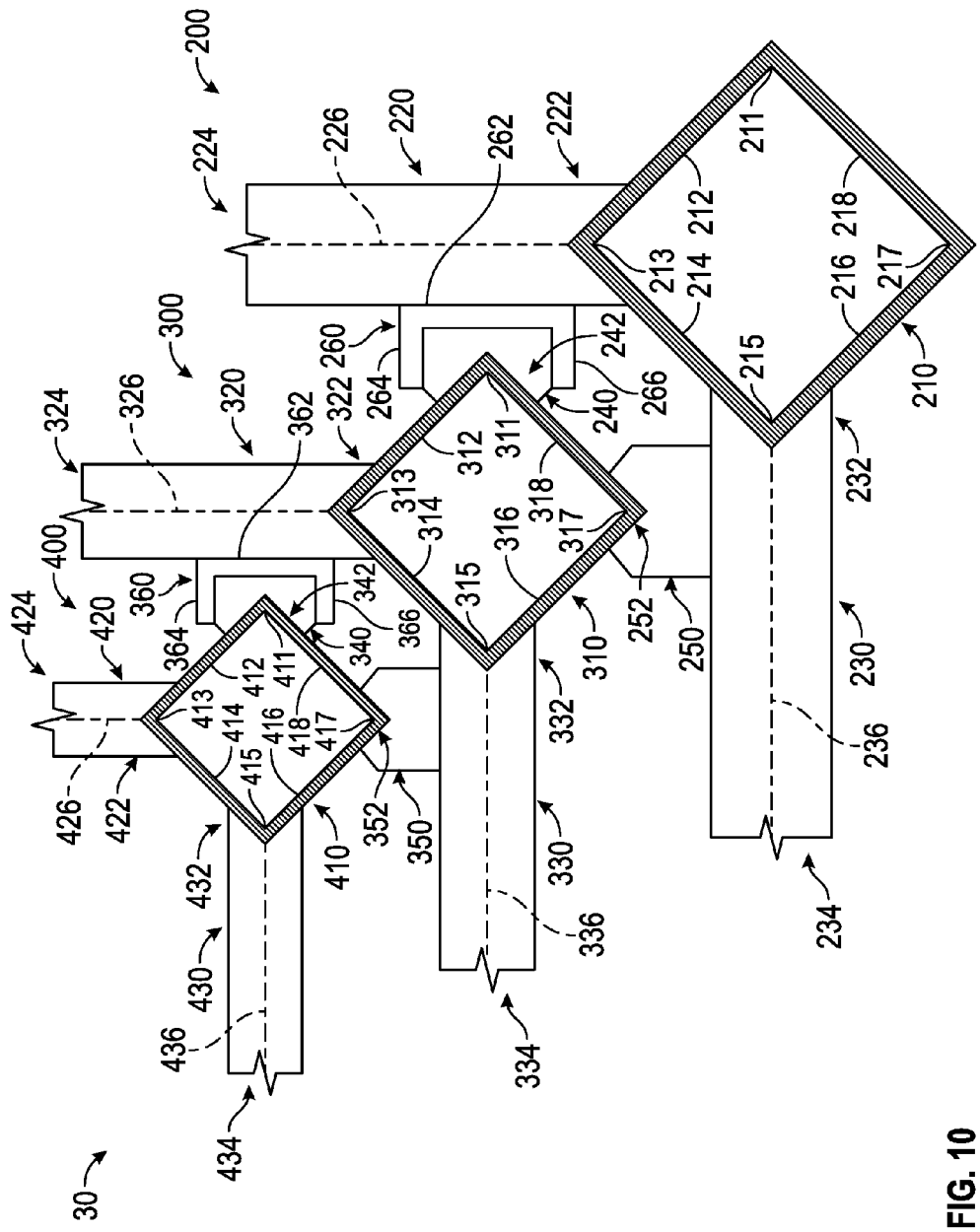
FIG. 10 is a cross-sectional view of a multi-section ladder assembly, according to an alternative embodiment.

According to the alternative embodiment shown in FIG. 10, the aerial ladder assembly 30 includes a plurality of telescoping ladder sections including a first ladder section, shown as first ladder section 200, a second ladder section, shown as second ladder section 300, and a third ladder section, shown as third ladder section 400. As shown in FIG. 10, the aerial ladder assembly 30 includes three sections. In other embodiments, the aerial ladder assembly 30 has more or fewer ladder sections (e.g., two sections, four sections, five sections, etc.).

According to the exemplary embodiment shown in FIG. 10, the first ladder section 200 includes a first base rail, shown as base rail 210, a first lacing member, shown as lacing member 220, and a first rung member, shown as rung member 230. As shown in FIG. 10, the base rail 210 is defined by wall 212, wall 214, wall 216, and wall 218. Each wall is coupled perpendicularly to an adjacent wall, forming a substantially rectangular cross-sectional shape. As shown in FIG. 10, wall 212, wall 214, wall 216, and wall 218 have a common length such that base rail 210 has a generally square cross-sectional shape. In other embodiments, the base rail 210 may have another cross-sectional shape (e.g., triangular, circular, hexagonal, etc.). A corner is defined at each of the points where adjacent walls intersect. As shown in FIG. 10, the base rail 210 includes four corners, shown as corner 211, corner 213, corner 215, and corner 217. According to an exemplary embodiment, corner 211 and corner 215 are horizontally-aligned while corner 213 and corner 217 are vertically-aligned. It should be understood that, while shown in the cross-sectional view of FIG. 10 as corners, corner 211, corner 213, corner 215, and corner 217 may define edges that extend along the length of base rail 210.

The lacing member 220 includes a first end (e.g., proximal end, base end, etc.), shown as first end 222, and a second end (e.g., distal end, railing end, etc.), shown as second end 224. As shown in FIG. 10, the lacing member 220 defines an axis, shown as axis 226, which is disposed along a centerline of the lacing member 220. In one embodiment, axis 226 is positioned vertically. In other embodiments, lacing member 220 is tilted (e.g., tilted outward from a centerline of the first ladder section 200, etc.) such that axis 226 is angularly offset relative to a vertical axis. Lacing member 220 may have various cross-sectional shapes (e.g., circular, rectangular, square, etc.). As shown in FIG. 10, the first end 222 of the lacing member 220 abuts the wall 212 and the wall 214 of the base rail 210. In one embodiment, base rail 210 is positioned such that corner 213 and corner 217 are positioned along axis 226. Base rail 210 may thereby have a substantially diamond-shaped configuration. The second end 224 of the lacing member 220 may extend toward a hand rail. The rung member 230 includes a first end, shown as first end 232, and a second end, shown as second end 234. The rung member 230 defines an axis, shown as axis 236, which is disposed along a centerline of the rung member 230. In one embodiment, axis 236 is positioned horizontally. Rung member 230 may have various cross-sectional shapes (e.g., circular, square, rectangular, etc.). The first end 232 of the rung member 230 abuts the wall 214 and the wall 216 of the base rail 210. In one embodiment, base rail 210 is positioned such that corner 211 and corner 215 are disposed along axis 236. The second end 234 of the rung member 230 may extend toward a second base rail 210.

Referring still to FIG. 10, a channel member, shown as channel member 260, is attached to an interior surface of the lacing member 220 (e.g., a surface disposed laterally inward and facing a centerline of the first ladder section 200, etc.). As shown in FIG. 10, the channel member 260 includes a base 262 that abuts the lacing member 220, a first flange 264, and a second flange 266. The channel member 260 is configured to receive a first slide pad, shown as slide pad 240. The slide pad 240 includes a notch, shown as notch 242. A second slide pad, shown as slide pad 250, directly abuts the rung member 230. The slide pad 250 also includes a notch, shown as notch 252. In other embodiments, at least one of slide pad 240 and slide pad 250 has another cross-sectional shape. According to an alternative embodiment, at least one of slide pad 240 and slide pad 250 are otherwise coupled to lacing member 220 and rung member 230 or coupled to still another component of first ladder section 200.

According to the exemplary embodiment shown in FIG. 10, the second ladder section 300 includes a first base rail, shown as base rail 310, a first lacing member, shown as lacing member 320, and a first rung member, shown as rung member 330. As shown in FIG. 10, the base rail 310 is defined by wall 312, wall 314, wall 316, and wall 318. Each wall is coupled perpendicularly to an adjacent wall, forming a substantially rectangular cross-sectional shape. As shown in FIG. 10, wall 312, wall 314, wall 316, and wall 318 have a common length such that base rail 310 has a generally square cross-sectional shape. In other embodiments, the base rail 310 may have another cross-sectional shape (e.g., triangular, circular, hexagonal, etc.). A corner is defined at each of the points where adjacent walls intersect. As shown in FIG. 10, the base rail 310 includes four corners, shown as corner 311, corner 313, corner 315, and corner 317. According to an exemplary embodiment, corner 311 and corner 315 are horizontally-aligned while corner 313 and corner 317 are vertically-aligned. It should be understood that, while shown in the cross-sectional view of FIG. 10 as corners, corner 311, corner 313, corner 315, and corner 317 may define edges that extend along the length of base rail 310.

The lacing member 320 includes a first end (e.g., proximal end, base end, etc.), shown as first end 322, and a second end (e.g., distal end, railing end, etc.), shown as second end 324. As shown in FIG. 10, the lacing member 320 defines an axis, shown as axis 326, which is disposed along a centerline of the lacing member 320. In one embodiment, axis 326 is positioned vertically. In other embodiments, lacing member 320 is tilted (e.g., tilted outward from a centerline of the second ladder section 300, etc.) such that axis 326 is angularly offset relative to a vertical axis. Lacing member 320 may have various cross-sectional shapes (e.g., circular, rectangular, square, etc.). As shown in FIG. 10, the first end 322 of the lacing member 320 abuts the wall 312 and the wall 314 of the base rail 310. In one embodiment, base rail 310 is positioned such that corner 313 and corner 317 are positioned along axis 326. Base rail 310 may thereby have a substantially diamond-shaped configuration. The second end 324 of the lacing member 320 may extend toward a hand rail. The rung member 330 includes a first end, shown as first end 332, and a second end, shown as second end 334. The rung member 330 defines an axis, shown as axis 336, which is disposed along a centerline of the rung member 330. In one embodiment, axis 336 is positioned horizontally. Rung member 330 may have various cross-sectional shapes (e.g., circular, square, rectangular, etc.). The first end 332 of the rung member 330 abuts the wall 314 and the wall 316 of the base rail 310. In one embodiment, base rail 310 is positioned such that corner 311 and corner 315 are disposed along axis 336. The second end 334 of the rung member 330 may extend toward a second base rail 310.

Referring still to FIG. 10, a channel member, shown as channel member 360, is attached to an interior surface of the lacing member 320 (e.g., a surface disposed laterally inward and facing a centerline of the second ladder section 300, etc.). As shown in FIG. 10, the channel member 360 includes a base 362 that abuts the lacing member 320, a first flange 364, and a second flange 366. The channel member 360 is configured to receive a first slide pad, shown as slide pad 340. The slide pad 340 includes a notch, shown as notch 342. A second slide pad, shown as slide pad 350, directly abuts the rung member 330. The slide pad 350 also includes a notch, shown as notch 352. In other embodiments, at least one of slide pad 340 and slide pad 350 has another cross-sectional shape. According to an alternative embodiment, at least one of slide pad 340 and slide pad 350 are otherwise coupled to lacing member 320 and rung member 330 or coupled to still another component of second ladder section 300.

According to the exemplary embodiment shown in FIG. 10, the third ladder section 400 includes a first base rail, shown as base rail 410, a first lacing member, shown as lacing member 420, and a first rung member, shown as rung member 430. As shown in FIG. 10, the base rail 410 is defined by wall 412, wall 414, wall 416, and wall 418. Each wall is coupled perpendicularly to an adjacent wall, forming a substantially rectangular cross-sectional shape. As shown in FIG. 10, wall 412, wall 414, wall 416, and wall 418 have a common length such that base rail 410 has a generally square cross-sectional shape. In other embodiments, the base rail 410 may have another cross-sectional shape (e.g., triangular, circular, hexagonal, etc.). A corner is defined at each of the points where adjacent walls intersect. As shown in FIG. 10, the base rail 410 includes four corners, shown as corner 411, corner 413, corner 415, and corner 417. According to an exemplary embodiment, corner 411 and corner 415 are horizontally-aligned while corner 413 and corner 417 are vertically-aligned. It should be understood that, while shown in the cross-sectional view of FIG. 10 as corners, corner 411, corner 413, corner 415, and corner 417 may define edges that extend along the length of base rail 410.

The lacing member 420 includes a first end (e.g., proximal end, base end, etc.), shown as first end 422, and a second end (e.g., distal end, railing end, etc.), shown as second end 424. As shown in FIG. 10, the lacing member 420 defines an axis, shown as axis 426, which is disposed along a centerline of the lacing member 420. In one embodiment, axis 426 is positioned vertically. In other embodiments, lacing member 420 is tilted (e.g., tilted outward from a centerline of the third ladder section 400, etc.) such that axis 426 is angularly offset relative to a vertical axis. Lacing member 420 may have various cross-sectional shapes (e.g., circular, rectangular, square, etc.). As shown in FIG. 10, the first end 422 of the lacing member 420 abuts the wall 412 and the wall 414 of the base rail 410. In one embodiment, base rail 410 is positioned such that corner 413 and corner 417 are disposed along axis 426. Base rail 410 may thereby have a substantially diamond-shaped configuration. The second end 424 of the lacing member 420 may extend toward a hand rail. The rung member 430 includes a first end, shown as first end 432, and a second end, shown as second end 434. The rung member 430 defines an axis, shown as axis 436, which is disposed along a centerline of the rung member 430. In one embodiment, axis 436 is positioned horizontally. Rung member 430 may have various cross-sectional shapes (e.g., circular, square, rectangular, etc.). The first end 432 of the rung member 430 abuts the wall 414 and the wall 416 of the base rail 410. In one embodiment, base rail 410 is positioned such that corner 411 and corner 415 are disposed along axis 436. The second end 434 of the rung member 430 may extend toward a second base rail 410.

According to the exemplary embodiment shown in FIG. 10, first ladder section 200 is configured to receive second ladder section 300. As shown in FIG. 10, notch 242 of slide pad 240 and notch 252 of slide pad 250 have a cross-sectional shape that corresponds to a cross-sectional shape of base rail 310 of second ladder section 300. Notch 242 and notch 252 may thereby receive corner 311 and corner 317 of base rail 310, respectively. An actuator may be used to extend and retract second ladder section 300 from first ladder section 200. During actuation (e.g., extension, retraction, etc.), base rail 310 of second ladder section 300 may slide along slide pad 240 and slide pad 250, within notch 242 and notch 252. Second ladder section 300 is configured to receive third ladder section 400. As shown in FIG. 10, notch 342 of slide pad 340 and notch 352 of slide pad 350 have a cross-sectional shape that corresponds to a cross-sectional shape of base rail 410 of third ladder section 400. Notch 342 and notch 352 may thereby receive corner 411 and corner 417 of base rail 410, respectively. An actuator may be used to extend and retract third ladder section 400 from second ladder section 300. During actuation (e.g., extension, retraction, etc.), base rail 410 of third ladder section 400 may slide along slide pad 340 and slide pad 350, within notch 342 and notch 352. In other embodiments, third ladder section 400 includes slide pads shaped to receive an additional ladder section (e.g., a fly section, etc.). Such slide pads may be shaped and interact in a manner like those of first ladder section 200 and second ladder section 300.

According to an exemplary embodiment, the ladder assembly includes base rails that are positioned such that loading imparted by the lacing members and that rungs is directed into corners of the base rails. The ladder assembly may also include slide pads shaped to receive the base rails (e.g., corners of the base rails, etc.) such that stresses transferred between ladder sections also flow through the corners of the base rails. In one embodiment, positioning and configuring the base rails, slide pads, lacing members, and rungs to direct loading through the corners of the base rails reduces weight, improves strength, and enhances the horizontal reach of the ladder assembly.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:
1. An aerial ladder assembly for a fire apparatus, comprising:

a first truss member including a first base rail, a first hand rail elevated from the first base rail, and a plurality of lacing members coupling the first base rail to the first hand rail, wherein the first truss member extends along a longitudinal direction;

a second truss member including a second base rail, a second hand rail elevated from the second base rail, and a plurality of lacing members coupling the second base rail to the second hand rail, wherein the second truss member extends along the longitudinal direction; and a plurality of rungs coupling the first truss member to the second truss member, the plurality of rungs extending across the longitudinal direction, wherein the first truss member and the second truss member define a first zone and a second zone separated by a transition, the first base rail and the second base rail each comprising a first tubular member and a second tubular member within the first zone that are fixed together to provide at least portions of the first base rail and the second base rail, wherein the second tubular members are disposed inward of the first tubular members, wherein the first base rail and the second base rail each have a first shape within the first zone and a second shape within the second zone, and wherein the first shape is different than the second shape.

2. The aerial ladder assembly of claim 1, wherein the second tubular members of the first base rail and the second base rail terminate at the transition, the first tubular members continuing through the second zone of the first truss member and the second truss member.

3. The aerial ladder assembly of claim 2, further comprising a brace coupling the first tubular members and the second tubular members of the first base rail and the second base rail.

4. The aerial ladder assembly of claim 3, wherein the brace includes a top plate and a side leg, wherein the side leg is angularly offset relative to the top plate.

* * * * *